United States Patent [19]
Fett

[11] Patent Number: 6,019,696
[45] Date of Patent: Feb. 1, 2000

[54] LIMITED SLIP PLANET GEAR FOR A MOTOR VEHICLE DIFFERENTIAL ASSEMBLY

[75] Inventor: Gregory A. Fett, Fort Wayne, Ind.

[73] Assignee: Dana Corporation, Toledo, Ohio

[21] Appl. No.: 09/161,806

[22] Filed: Sep. 28, 1998

[51] Int. Cl.$^7$ .................................................. F16H 48/10
[52] U.S. Cl. ............................................. 475/249; 464/45
[58] Field of Search ................................. 475/305, 249; 74/411; 464/30, 45, 46, 47

[56] References Cited

U.S. PATENT DOCUMENTS

| | | |
|---|---|---|
| 1,038,047 | 9/1912 | Wetherbee ................................ 464/30 |
| 1,225,856 | 5/1917 | Quick ........................................ 464/45 |
| 1,783,877 | 12/1930 | Gribojedoff ............................. 475/305 |
| 1,896,099 | 2/1933 | Quick ........................................ 464/45 |

*Primary Examiner*—Dirk Wright
*Attorney, Agent, or Firm*—Oldham & Oldham Co., L.P.A.

[57] ABSTRACT

A limited slip planet gear for a motor vehicle differential assembly which uses a segmented planet gear having a plurality of fixed plates positioned between a corresponding plurality of planet gear segments. The plurality of fixed plates are preferably keyed to a planet gear pin and the plurality of fixed plates and the corresponding plurality of planet gear segments are compressed using a resilient compression member, for example, one or more belleville type springs or one or more leaf springs to provide limited slip capability to the motor vehicle differential assembly.

20 Claims, 2 Drawing Sheets

LIMITED SLIP PLANET GEAR FOR A MOTOR VEHICLE DIFFERENTIAL ASSEMBLY

BACKGROUND AND SUMMARY OF THE INVENTION

The present invention relates generally to a new and novel limited slip planet gear for a motor vehicle differential assembly. More particularly, the present invention relates to a new and novel limited slip planet gear for a motor vehicle differential assembly which provides a planet gear with limited slip capability in a motor vehicle differential assembly.

Known prior art motor vehicle planet gear differentials do not provide limited slip capability without the aid of a clutch or viscous coupling. Such limited slip capability is beneficial in a motor vehicle differential assembly to, for example, provide some torque to both outputs regardless of operating conditions. Accordingly, it would be desirable to provide a limited slip planet gear for a motor vehicle differential assembly without using costly clutches or viscous couplings.

A preferred embodiment of the present invention is, therefore, directed to a limited slip planet gear for a motor vehicle differential assembly which uses a segmented planet gear having a plurality of fixed plates positioned between a corresponding plurality of planet gear segments. The plurality of fixed plates are preferably keyed to a planet gear pin and the plurality of fixed plates and the corresponding plurality of planet gear segments are compressed using a resilient compression member, for example, one or more belleville type springs or one or more leaf springs, to provide limited slip capability to the motor vehicle differential assembly.

Other advantages and novel features of the present invention will become apparent in the following detailed description of the invention when considered in conjunction with the accompanying drawings.

DETAILED DESCRIPTION OF THE DRAWINGS

Figure 1:
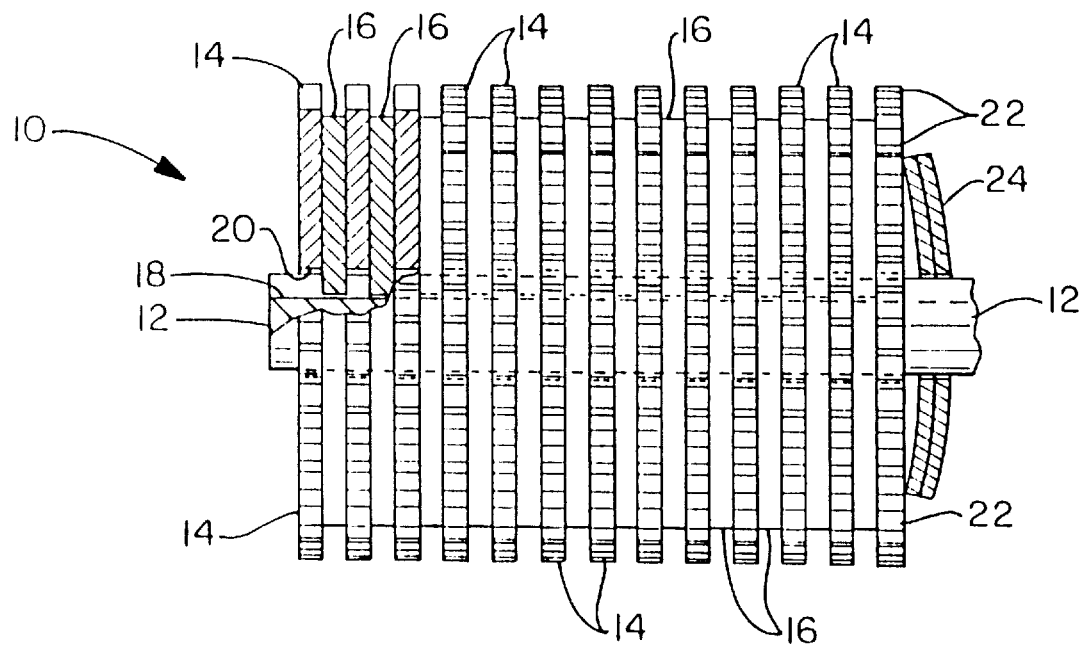
FIG. 1 is a side elevational view, partially in cross-section and partially in plan view, of a limited slip planet gear for a motor vehicle differential assembly in accordance with a preferred embodiment of the present invention.
Figure 2:
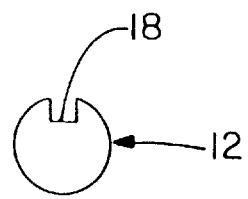
FIG. 2 is an end elevational side view of a planet gear pin used in the limited slip planet gear for a motor vehicle differential assembly in accordance with the preferred embodiment of the present invention shown in FIG. 1.
Figure 3:
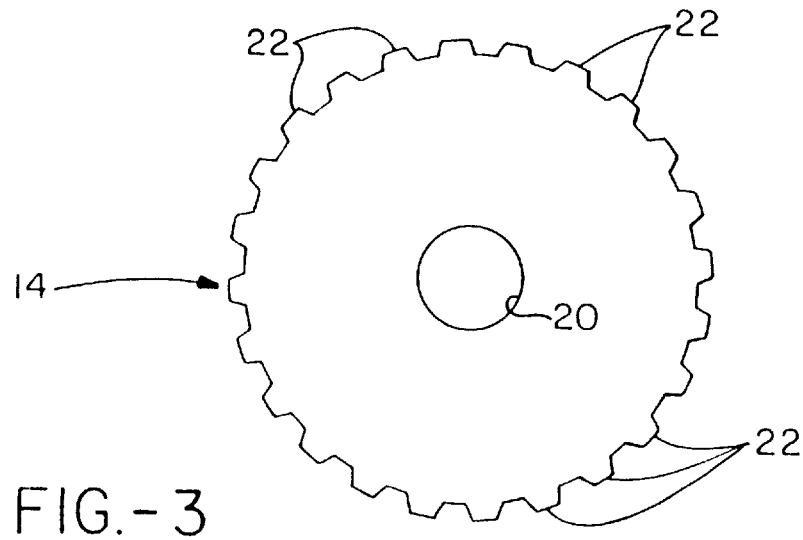
FIG. 3 is an end elevational view of a planet gear segment used in the limited slip planet gear for a motor vehicle differential assembly in accordance with the preferred embodiment of the present invention shown in FIG. 1.

In the following detailed description of a preferred embodiment of the present invention, reference is made to the accompanying drawings which, in conjunction with this detailed description, illustrate and describe a preferred embodiment of a limited slip planet gear for a motor vehicle differential assembly, generally identified by reference number 10, in accordance with the present invention. Referring now to the drawings, in which like-identified characters represent corresponding elements throughout the several views, attention is directed to FIG. 1 through 3, which illustrate a side elevational view of limited slip planet gear for a motor vehicle differential assembly 10 in accordance with a preferred embodiment of the present invention, an end elevational side view of planet gear pin 12 used in limited slip planet gear for a motor vehicle differential assembly 10 and an end elevational view of a representative planet gear segment 14 used in limited slip planet gear for a motor vehicle differential assembly 10, respectively. Limited slip planet gear for a motor vehicle differential assembly 10 generally includes a plurality of planet gear segments 14 with a plurality of fixed plates 16 corresponding to and positioned between adjacent planet gear segments 14.

Figure 4:
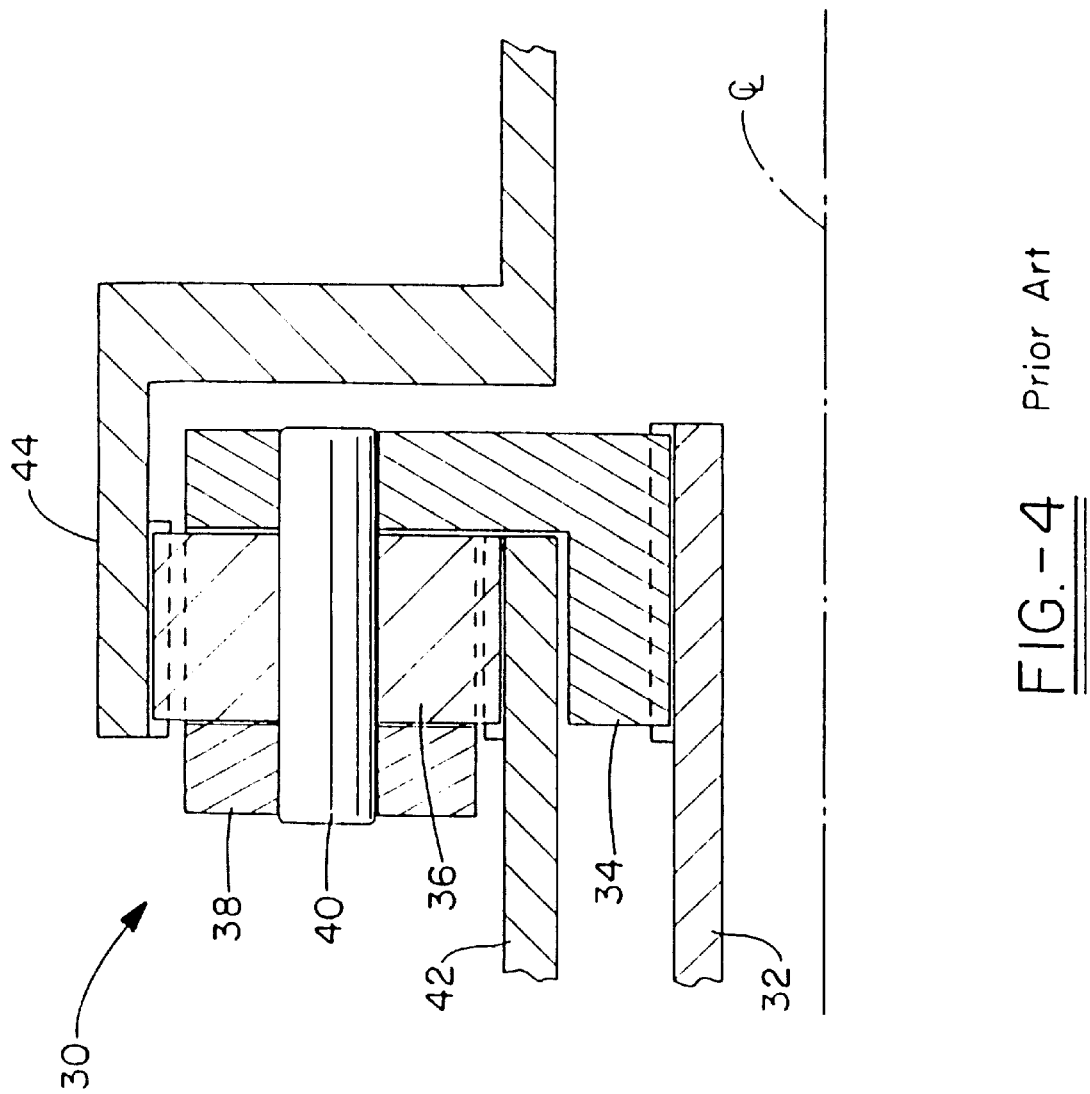
FIG. 4 is a side elevational view, partially in cross-section and partially in plan view, of a representative known prior art motor vehicle planetary differential assembly.

Planet gear pin 12 is generally cylindrical in configuration and includes longitudinally extending slot or groove 18 preferably extending the entire length of planet gear pin 12. Each of the plurality of fixed plates 16 are preferably substantially circular in configuration and include an inwardly extending projection which corresponds to and is retained in longitudinally extending slot or groove 18 to cause each of the plurality of fixed plates 16 to be axially fixed to, and thus rotate with, planet gear pin 12. Each of the plurality of planet gear segments 14 include substantially centered aperture 20 which is larger in diameter than the outside diameter of planet gear pin 12 and thus each of the plurality of planet gear segments is axially rotatable in relation to planet gear pin 12. Referring to FIG. 4, which shows a side elevational view, partially in cross-section and partially in plan view, of a representative known prior art motor vehicle planetary differential assembly, representative known prior art motor vehicle planetary differential assembly is identified by reference number 30. Representative known prior art motor vehicle planetary differential assembly 30 generally includes input 32 which transfers power to sun gear 34. Sun gear 34 is rotatably engaged with a plurality of rotatable planet gears 36 which, in the case of representative know prior art motor vehicle planetary differential assembly 30, are integral one-piece gears. Planet gears 36 are retained in position by planetary carrier 38 and planet gear pin 40 which, in the case of representative known prior art motor vehicle planetary differential assembly 30, has a cylindrical configuration. Planet gears 36 are rotatably engaged with first output 42 and second output 44. A plurality of limited slip planet gears for a motor vehicle differential assembly 10 are substituted for planet gears 36 in representative known prior art motor vehicle planetary differential assembly 30 to provide representative known prior art motor vehicle planetary differential assembly 30 with limited slip capability in accordance with the present invention.

The plurality of planet gear segments 14 and the corresponding plurality of fixed plates 16 positioned therebetween are compressed by resilient compression member 24, such as one or more belleville type springs or one or more leaf springs, to cause planet gear pin 12 and fixed plates 16 rotationally fixed thereto, and planet gear segments 14 to rotate together as long as the level of relative torque is less than a selected value. However, if the level of relative torque exceeds the selected value, planet gear segments 14 rotate relative to planet gear pin 12 and fixed plates 16 rotationally fixed thereto, providing limited slip capability for the motor vehicle differential assembly when the level of relative torque exceeds the selected value.

Although the present invention has been described above in detail, the same is by way of illustration and example only and is not to be taken as a limitation on the present invention. For example, the plurality of fixed plates 16 could be locked to an external case and gear teeth 22 in the plurality of planet gear segments 14 could be internal, similar to a conventional ring gear. Accordingly, the scope and content of the present invention are to be defined only by the terms of the appended claims.

What is claimed is:

1. A limited slip planet gear for a motor vehicle planetary differential assembly, said limited slip planet gear comprising:

a planet gear pin;

a plurality of fixed plates rotationally fixed to said planet gear pin so said plurality of fixed plates rotate with said planet gear pin;

a plurality of planet gear segments corresponding to and positioned between said plurality of fixed plates, said plurality of planet gear segments including gear teeth on an outside diameter thereof; and a resilient compression member which compresses said plurality of fixed plates and said corresponding plurality of planet gear segments to cause said plurality of fixed plates and said planet gear pin, and said corresponding plurality of planet gear segments to rotate together when the level of relative torque is less than a selected value and to cause said plurality of fixed plates and said planet gear pin, and said corresponding plurality of planet gear segments to rotate relative to each other when the level of relative torque is greater than the selected value.

2. The limited slip planet gear in accordance with claim 1, wherein said planet gear pin is substantially cylindrical in configuration and includes a longitudinally extending slot or groove and each of said plurality of fixed plates includes an inwardly extending projection corresponding to said longitudinally extending slot or groove such that said longitudinally extending slot or groove of said planet gear pin and said inwardly extending projection of each of said plurality of fixed plates causes said plurality of fixed plates to be fixed to said planet gear pin and to rotate with said planet gear pin.

3. The limited slip planet gear in accordance with claim 2, wherein said longitudinally extending slot or groove extends the entire length of said planet gear pin.

4. The limited slip planet gear in accordance with claim 3, wherein said resilient compression member includes one or more belleville type springs.

5. The limited slip planet gear in accordance with claim 3, wherein said resilient compression member includes one or more springs.

6. The limited slip planet gear in accordance with claim 3, wherein said gear teeth on said outside diameter of each of said plurality of planet gear segments are adapted to engage with corresponding gear teeth on at least one of a first output and a second output in the motor vehicle differential assembly.

7. The limited slip planet gear in accordance with claim 1, wherein said resilient compression member includes one or more belleville type springs.

8. The limited slip planet gear in accordance with claim 1, wherein said resilient compression member includes one or more springs.

9. The limited slip planet gear in accordance with claim 1, wherein said gear teeth on said outside diameter of each of said plurality of planet gear segments are adapted to engage with corresponding gear teeth on at least one of a first output and a second output in the motor vehicle differential assembly.

10. The limited slip planet gear in accordance with claim 2, wherein said gear teeth on said outside diameter of each of said plurality of planet gear segments are adapted to engage with corresponding gear teeth on at least one of a first output and a second output in the motor vehicle differential assembly.

11. A motor vehicle planetary differential assembly having a limited slip planet gear, said motor vehicle planetary differential assembly comprising:

an input;

a planet gear pin rotationally coupled in relation to at least one of a first output and a second output;

a plurality of fixed plates rotationally fixed to said planet gear pin so said plurality of fixed plates rotate with said planet gear pin;

a plurality of planet gear segments corresponding to and positioned between said plurality of fixed plates, said plurality of planet gear segments including gear teeth on an outside diameter thereof and said plurality of planet gear segments being rotationally coupled to at least one of said first output and said second output; and a resilient compression member which compresses said plurality of fixed plates and said corresponding plurality of planet gear segments to cause said plurality of fixed plates and said planet gear pin, and said corresponding plurality of planet gear segments to rotate together when the level of relative torque is less than a selected value and to cause said plurality of fixed plates and said planet gear pin, and said corresponding plurality of planet gear segments to rotate relative to each other when the level of relative torque is greater than the selected value.

12. The motor vehicle planetary differential assembly in accordance with claim 11, wherein said planet gear pin is substantially cylindrical in configuration and includes a longitudinally extending slot or groove and each of said plurality of fixed plates includes an inwardly extending projection corresponding to said longitudinally extending slot or groove such that said longitudinally extending slot or groove of said planet gear pin and said inwardly extending projection of each of said plurality of fixed plates causes said plurality of fixed plates to be fixed to said planet gear pin and to rotate with said planet gear pin.

13. The motor vehicle planetary differential assembly in accordance with claim 12, wherein said longitudinally extending slot or groove extends the entire length of said planet gear pin.

14. The motor vehicle planetary differential assembly in accordance with claim 13, wherein said resilient compression member includes one or more belleville type springs.

15. The motor vehicle planetary differential assembly in accordance with claim 13, wherein said resilient compression member includes one or more springs.

16. The motor vehicle planetary differential assembly in accordance with claim 13, wherein said gear teeth on said outside diameter of each of said plurality of planet gear segments are adapted to engage with corresponding gear teeth on at least one of said first output and said second output in the motor vehicle differential assembly.

17. The motor vehicle planetary differential assembly in accordance with claim 11, wherein said resilient compression member includes one or more belleville type springs.

18. The motor vehicle planetary differential assembly in accordance with claim 11, wherein said resilient compression member includes one or more springs.

19. The motor vehicle planetary differential assembly in accordance with claim 11, wherein said gear teeth on said outside diameter of each of said plurality of planet gear segments are adapted to engage with corresponding gear teeth on at least one of said first output and said second output in the motor vehicle differential assembly.

20. The motor vehicle planetary differential assembly in accordance with claim 12, wherein said gear teeth on said outside diameter of each of said plurality of planet gear segments are adapted to engage with corresponding gear teeth on at least one of said first output and said second output in the motor vehicle differential assembly.

* * * * *